United States Patent [19]

Castonguay et al.

[11] Patent Number: 4,489,362
[45] Date of Patent: Dec. 18, 1984

[54] ELECTRIC SWITCHBOARD APPARATUS WITH A BREAKER-FUSE INTERLOCK

[75] Inventors: Roger N. Castonguay, Terryville; Jon P. McCuin, Bristol; David B. Powell, Burlington, all of Conn.

[73] Assignee: General Electric Company, New York, N.Y.

[21] Appl. No.: 471,092

[22] Filed: Mar. 1, 1983

[51] Int. Cl.³ .............................................. H02B 1/04
[52] U.S. Cl. .............................. 361/339; 200/50 AA; 200/50 C; 361/343
[58] Field of Search ............... 361/337, 339, 343, 357, 361/360, 391, 432; 200/50 R, 50 AA, 50 C, 50 A, 50 B; 335/160

[56] References Cited

U.S. PATENT DOCUMENTS

| | | | |
|---|---|---|---|
| 1,342,546 | 6/1920 | Krantz | 361/360 |
| 2,531,157 | 11/1950 | Pifke | 335/160 |
| 2,646,474 | 7/1953 | Stratton | 200/50 C |
| 2,658,170 | 11/1953 | Caswell | 361/337 |
| 2,904,649 | 9/1959 | Ranson | 200/50 C |
| 2,982,827 | 5/1961 | Goetz | 200/50 C |
| 3,562,452 | 2/1971 | Keogh | 361/339 |
| 3,573,559 | 4/1971 | Rogers | 361/339 |
| 3,579,045 | 5/1971 | Keogh | 361/339 |
| 4,317,160 | 2/1982 | Tillson et al. | 361/339 |

Primary Examiner—A. D. Pellinen
Assistant Examiner—Gregory D. Thompson
Attorney, Agent, or Firm—R. A. Menelly; W. C. Bernkopf; Fred Jacob

[57] ABSTRACT

A switchgear unit contains interlocked circuit breaker and fuse compartments. The interlock prevents the fuses from being withdrawn from their power stabs until the circuit breaker is withdrawn from its power stabs first. A mechanical linkage arrangement causes an interference between the racking tool and the fuse compartment racking shaft until the breaker is withdrawn from the breaker compartment power stabs.

9 Claims, 6 Drawing Figures

ELECTRIC SWITCHBOARD APPARATUS WITH A BREAKER-FUSE INTERLOCK

BACKGROUND OF THE INVENTION

Circuit breakers for industrial applications up to 4000 amperes, 600 volts AC, are generally enclosed within switchboard-type compartments which include interlocks to ensure that the breaker contacts are open when the circuit breaker is connected with the power connectors at the rear of the switchboard. U.S. Pat. No. 4,317,160 to Robert S. Tillson et al., which patent is incorporated for purposes of reference, describes one such switchboard. The switchboard compartments are rated in terms of maximum continuous current through the enclosed breakers while the breakers themselves may have varying short circuit current ratings depending upon their application. One approach to increasing the short circuit current capability of a breaker within a particular frame size is to electrically connect a fuse in series with the breaker. The combination of the breaker and fuse rating additively combine to provide substantially increased short circuit protection. When the circuit breaker is contained within one compartment of the switchboard and the fuse is connected in a separate compartment, some means must be provided to assure that the fuses are not withdrawn from the compartment power stabs when the stabs are energized. Since the breaker completes the circuit through the fuses when its contacts are closed, the breaker must always be withdrawn from its compartment power stabs first and connected last so that the fuses are consequently withdrawn from and plugged onto non-energized power stabs.

A known approach to ensuring that the circuit breaker is withdrawn from its compartment power stabs before the fuses and connected with its power stabs after the fuses are connected, is by the use of Kirk keys, which are supplied by the ITE Corporation, Philadelphia, Pa. The switchgear manufacturer arranges a lock on the breaker compartment and a lock on the fuse compartment and provides a single key. When the key is inserted within the breaker compartment lock, the breaker must be withdrawn from the compartment power stabs in order to remove the key from the lock. The key arrangement performs well in most instances, but problems can occur in the event that the single key is lost.

This invention provides a breaker-fuse interlock for ensuring that the circuit breaker is always withdrawn from its compartment power stabs before the fuses are withdrawn and always connected after the fuses are connected. The interlock system of the invention allows the customer to install the breaker and fuse on his own premises, unlike the Kirk key arrangement.

SUMMARY OF THE INVENTION

A circuit breaker compartment and a fuse compartment are electrically connected in series within a switchgear unit. A mechanical linkage arrangement between the two compartments causes an interference with the fuse compartment racking shaft and the racking tool until the circuit breaker is withdrawn from its compartment power stabs. This arrangement ensures that the fuse can never be withdrawn from its compartment power stabs until the breaker is withdrawn first and ensures that the fuse can never be connected with its compartment power stabs unless the breaker is withdrawn from its power stabs first. At no time can the fuse be connected with nor disconnected from energized power stabs.

DESCRIPTION OF THE PREFERRED EMBODIMENT

Figure 1:
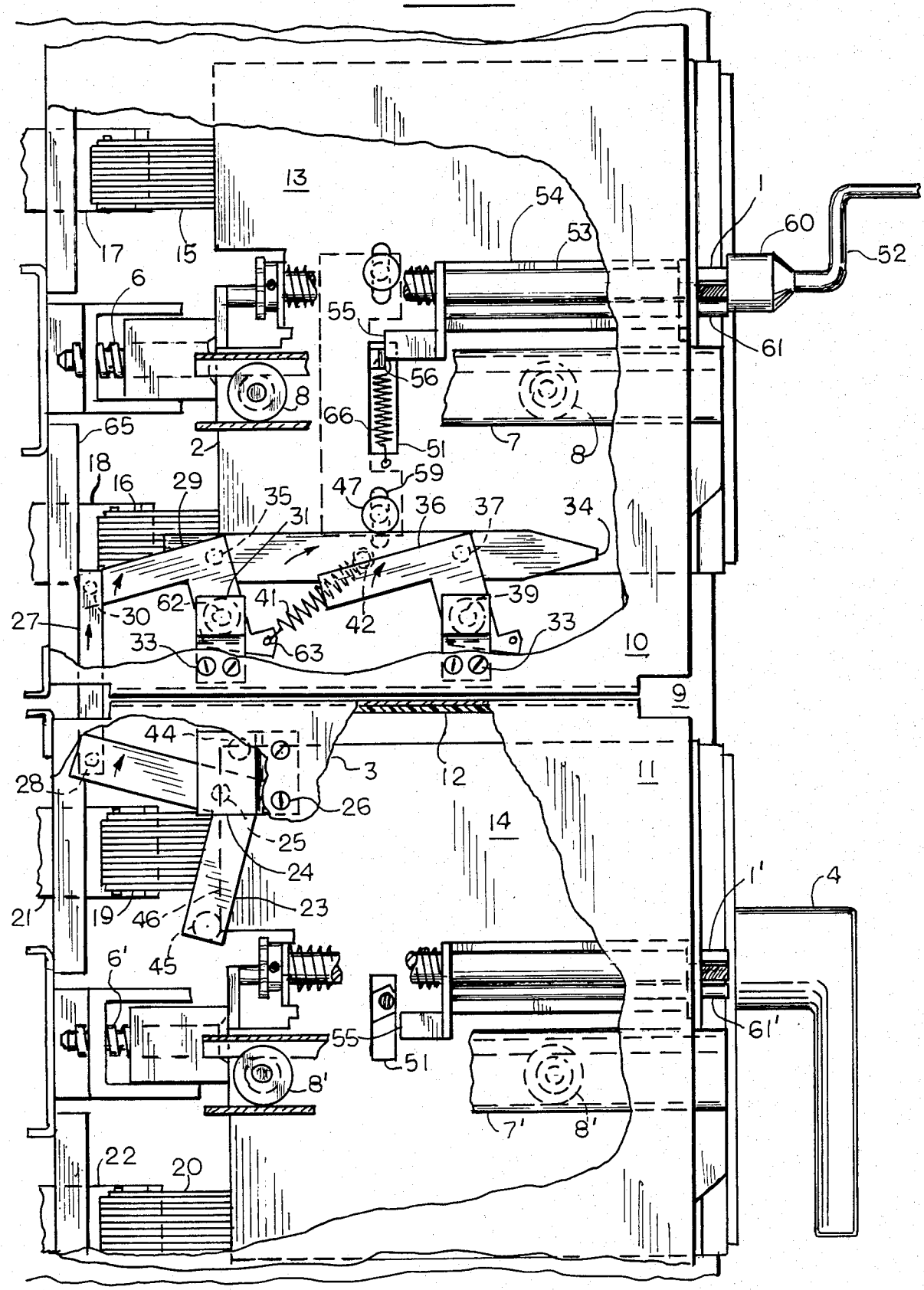
FIG. 1 is a cutaway side view of a switchgear unit containing both a fuse compartment and a circuit breaker compartment, and containing the interlock according to the invention. Both the circuit breaker and the fuses are electrically connected with their corresponding line and load stabs.

The switchgear unit 9 shown in FIG. 1 is described in the aforementioned patent to Tillson et al and a more detailed description of the drawout arrangement and the breaker interlocks can be obtained by referring to this patent. Switchgear unit 9 contains an upper fuse compartment 10 and a lower breaker compartment 11 divided by a barrier 12. The fuse carriage 13 contains a side plate 2 which supports the carriage shaft 53, slide 54 and wheels 8. The interlocking and racking function of the switchgear unit are mainly provided by means of shaft 53 and slide 54 interconnecting with the racking means 6 at the rear end of the fuse compartment 10. A formed end 1 on shaft 53 receives a socket 60 on wrench 52 for racking and unracking the fuses. When the fuses (not shown) are racked within the compartment, the fuse line and load plugs 15, 16, are in mechanical and electrical connection with the corresponding fuse line and load stabs 17, 18. The fuse carriage is removed from the compartment by means of wheels 8 and rail 7 which extends along the bottom of the compartment. As further described in the aforementioned patent to Tillson et al. an interlock rod 61 is employed to prevent socket 60 from contacting formed end 1 to prevent racking with the fuse line and load stabs under certain predetermined conditions. In a similar manner a circuit breaker (not shown) is located within breaker compartment 11 and a breaker carriage 14 is used for racking and unracking the breaker line and load plugs 19, 20 with the breaker line and load stabs 21, 22 via racking means 6'. The breaker is removed from compartment 11 by means of operating handle 4, wheels 8' and track 7' in a manner similar to that described for the fuses. The breaker interlock arrangement of the patent to Tillson et al. utilizes interlock rod 61' to prevent the breaker from being unracked from the breaker line and load stabs until the breaker is in a tripped condition. This is to prevent arcing between the breaker line and load plugs 19, 20 and the breaker line and load stabs 21, 22 which would otherwise occur. This arrangement also prevents the breaker from making contact with the breaker line and load stabs unless the breakr is in its tripped position. The breaker-fuse interlock arrangement of the invention further extends the Tillson et al. interlock concept such that the breaker must first be unracked, i.e. withdrawn from its power stabs, within breaker compartment 11 before the fuses can be unracked within fuse compartment 10 and must not be racked within breaker compartment 11 until the fuses are racked within fuse compartment 10. It is to be noted that only one line and load stab and plug is depicted in the drawings, although 3 are actually employed, one for each phase. There are three fuses, one for connection with each of the separate phases, although the fuses are omitted for purposes of clarity. The fuse breaker interlock is accomplished by means of mechanical interconnection between the two compartments, 10, 11 beginning with an angular lever 23 pivotally connected by means of pin 25 with a bracket 24 within compartment 11. The bracket is attached to the breaker compartment side plate 3 by means of fasteners 26. Pin 44 provides a stop for lever 23 when rotated opposite (or in reverse of) the indicated direction. A contact pin 45 extending from the back surface of lever 23 contacts a rear portion of the breaker carriage to rotate lever 23 in a clockwise direction about pin 25. Lever 23 is attached to one end of a connecting link 27 by means of pivot pin 28. The other end of connecting link 27 is connected to a lever 29 by means of pivot pin 30. This interconnection of link 27 and levers 23 and 29 provides a bellcrank motion wherein the rotational movement of lever 23 results in the translation of lifting motion via link 27, lever 29 and pin 35 to liftbar unit 34. Lever 29 is pivotally attached to bracket 31 by means of pivot pin 62 and bracket 31 is fixedly attached to the fuse compartment side plate 2 by means of a pair of fasteners 33. A similar lever 36 is attached to liftbar 34 by means of pivot pin 37 for providing added stability to liftbar 34. Both the fuse carriage 13 and the breaker carriage 14 are shown in FIG. 1 within their respective compartments 10, 11 in a racked IN position. In this position the back surface 46 of breaker carriage 14 is in interference contact with pin 45 and lever 23 is in its fully extended clockwise position. Connecting link 27 is fully extended upright along with lever 29. Liftbar 34 is fully extended away from the inner rear surface 65 of fuse compartment 10 against a return force provided by return spring 41, which is held in its extended position by connection with pin 42 on liftbar 34 at one end, and by connection with an opening 63 on lever 29 at its opposite end. It is to be noted that an operator is prevented from unracking the fuses within fuse compartment 10 by the interference between interlock rod 61 and tool socket 60, which prevents socket 60 from engaging the formed end 1 of shaft 53, thereby preventing operation of the racking means 6. Interlock rod 61', within breaker compartment 11 also prevents an operator from applying a socket wrench to the formed end 1' on the breaker carriage 14 until the breaker is tripped, as described within the patent to Tillson et al. Once the breaker is tripped by an auxiliary tripping device accessible from the exterior of the breaker compartment, a wrench can be employed to unrack the breaker so that the breaker carriage 14 can be moved to the position indicated in FIG. 2.

Figure 2:
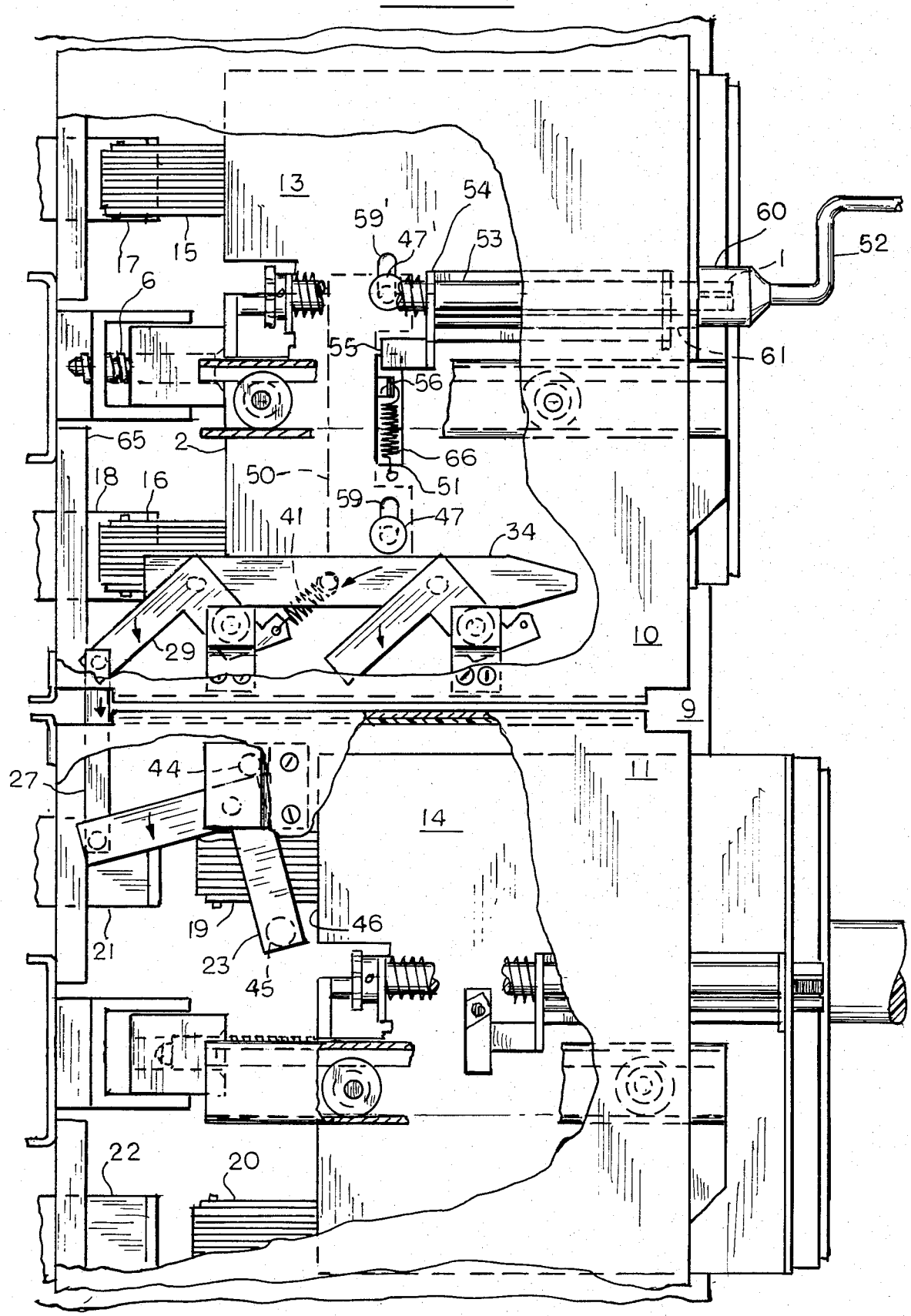
FIG. 2 is a cutaway side view of the switchgear unit of FIG. 1 with the circuit breaker disconnected from its line and load stabs and with the fuses still connected with their line and load stabs.
Figure 6:
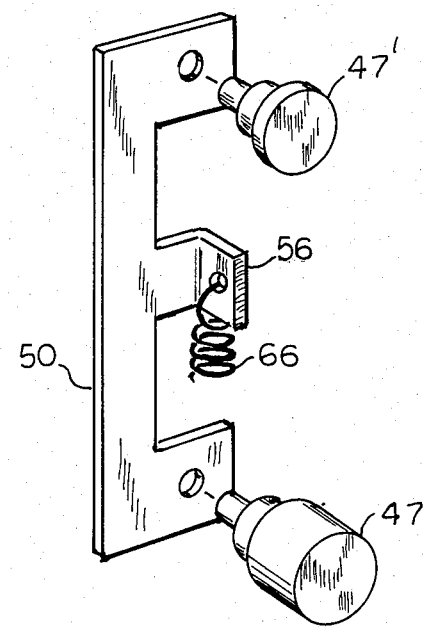
FIG. 6 is an enlarged perspective front view of the slide depicted in FIG. 5.

The breaker within carriage 14, in FIG. 2, is unracked such that the breaker line and load plugs 19, 20 no longer connect with line and load stabs 21, 22 and hence, no current can flow through the fuse line and load stabs 17 and 18 to the fuse line and load plugs 15, 16. The fuses can therefore be removed from fuse compartment 10 without any danger to the operator. With breaker carriage 14 in the position shown in FIG. 2., pin 45 is no longer in inteference contact with the back surface 46 of the breaker carriage. Lever 23 is returned to its rearmost position against pin 44 and connecting link 27 and lever 29 are returned to the downward position as indicated. The force for the return motion is provided by return spring 41 which also moves liftbar 34 both in a downward and a rearward direction closest to the fuse compartment rear surface 65. An E-shaped slide 50 having the configuration depicted in FIG. 6 wherein pins 47, 47' extend from the bottom and top and a bent tab 56 is provided approximately intermediate both pins such that pins 47, 47' and tab 56 extend in the same plane, is situated behind the fuse carriage side wall 2 as indicated in dashed lines in FIG. 2. Pin 47 extends through a slot 59 formed within the side wall and pin 47' extends through a slot 59' to add stability to the slide. Tab 56 extends through a separate slot 51 also provided through the fuse carriage side wall 2. Spring 66 biases slide 50 in a downward direction so that pins 47, 47' are at the bottom of their respective slots 59, 59' when liftbar 34 is in the downward position indicated in FIG. 2. When liftbar 34 is in the upward position shown in FIG. 1, pins 47, 47' are in the upward position within their respective slots such that pin 47 rests on liftbar 34 and tab 56 fronts a projection 55 on the forward surface of slide 54 which prevents interlock rod 61 from moving away from formed end 1. As described earlier, interlock rod 61 is coextensive with formed end 1 in this position and prevents the socket 60 of wrench 52 from engaging the formed end to operate the racking means 6. When the breaker is unracked from the line and load stabs 21, 22 as depicted in FIG. 2, liftbar 34 is in its downward position such that slide 50 and hence, pins 47, 47' and tab 56 are brought to the bottommost portion of their respective slots under the force of spring 66. In the position indicated in FIG. 2 socket 60 on the end of wrench of 52 readily fits over formed end 1 since interlock rod 61, slide 54 and projection 55 are no longer blocked by tab 56. This now allows the fuses in housing 10 to be unracked from corresponding line and load stabs 17, 18 via racking means 6.

Figure 3:
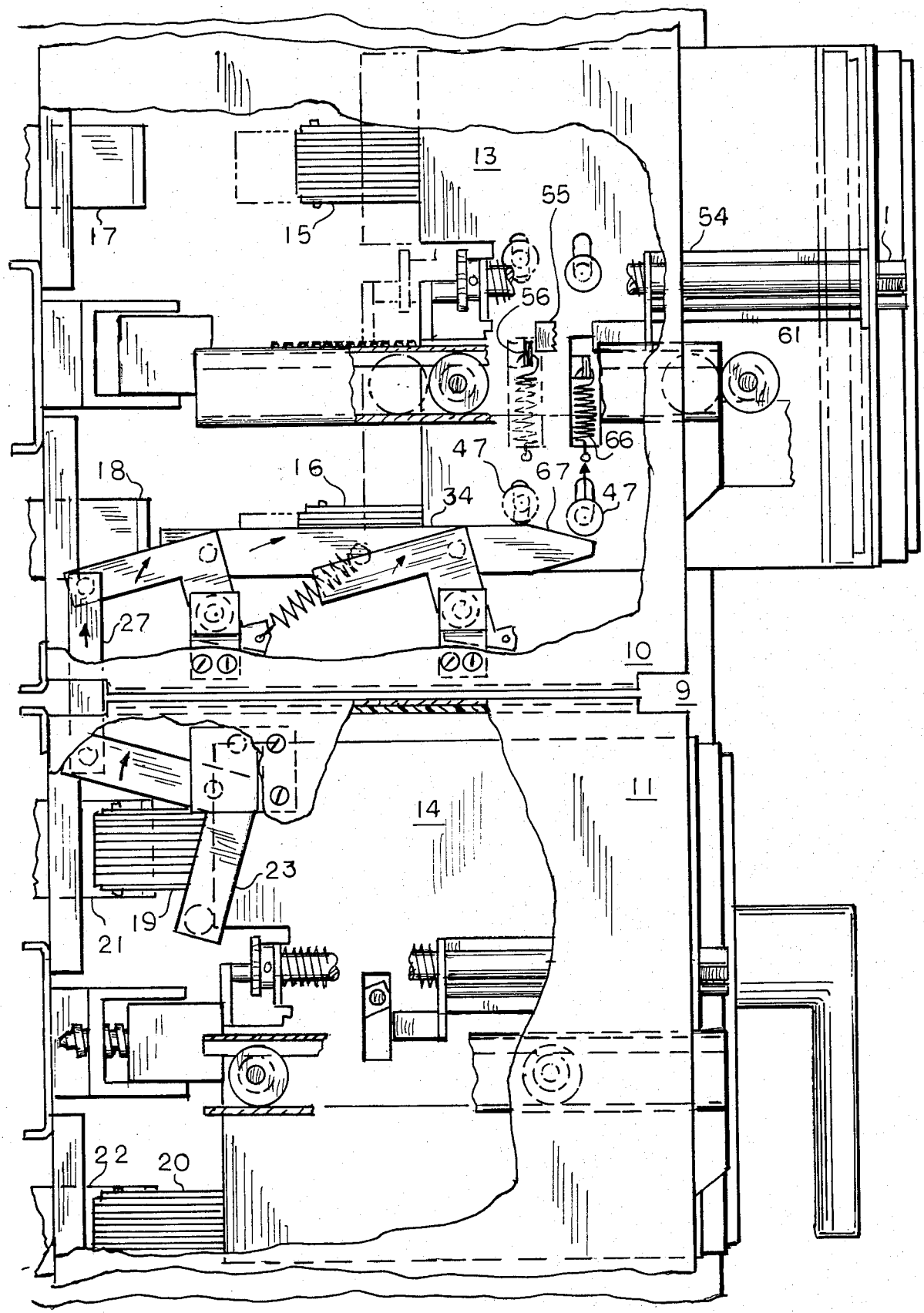
FIG. 3 is a cutaway side view of the switchgear unit of FIGS. 1 and 2 with the circuit breaker connected with its line and load stabs and with the fuses disconnected from their line and load stabs.

FIG. 3 shows switchgear unit 9 with the circuit breaker carriage 14 fully within the unit such that the breaker is in its racked IN position. The line and load plugs 19, 20, are fully connected with the corresponding line and load stabs 21, 22. Carriage 13 has been rolled out of compartment 10 such that the fuse line and load plugs 15, 16 are disconnected from their corresponding line and load stabs 17, 18. Lever 23 is in the fully extended position and connecting link 27 is in the vertical position similar to that shown earlier in FIG. 1. If an operator now attempts to insert the fuse carrige 13 fully within fuse housing 10, pin 47 on slide 50 contacts the forward slanted surface 67 of liftbar 34 forcing slide 50 in the indicated direction such that tab 56 and pin 47 assume the position indicated in phantom such that tab 56 fronts projection 55 on slide 54 and prevents interlock rod 61 from moving away from end 1 preventing insertion of the operator's wrench when he attempts to rack the fuses. The provision of the inclined forward surface 67 on liftbar 34 is an important feature of this invention since it overcomes the bias exerted by spring 66 which otherwise holds tab 56 away from projection 55 on slide 54. In order to rack the fuses within the fuse compartment, it is then necessary to unrack the breaker and move the breaker carriage 14 to the position shown in FIG. 2.

Figure 4:
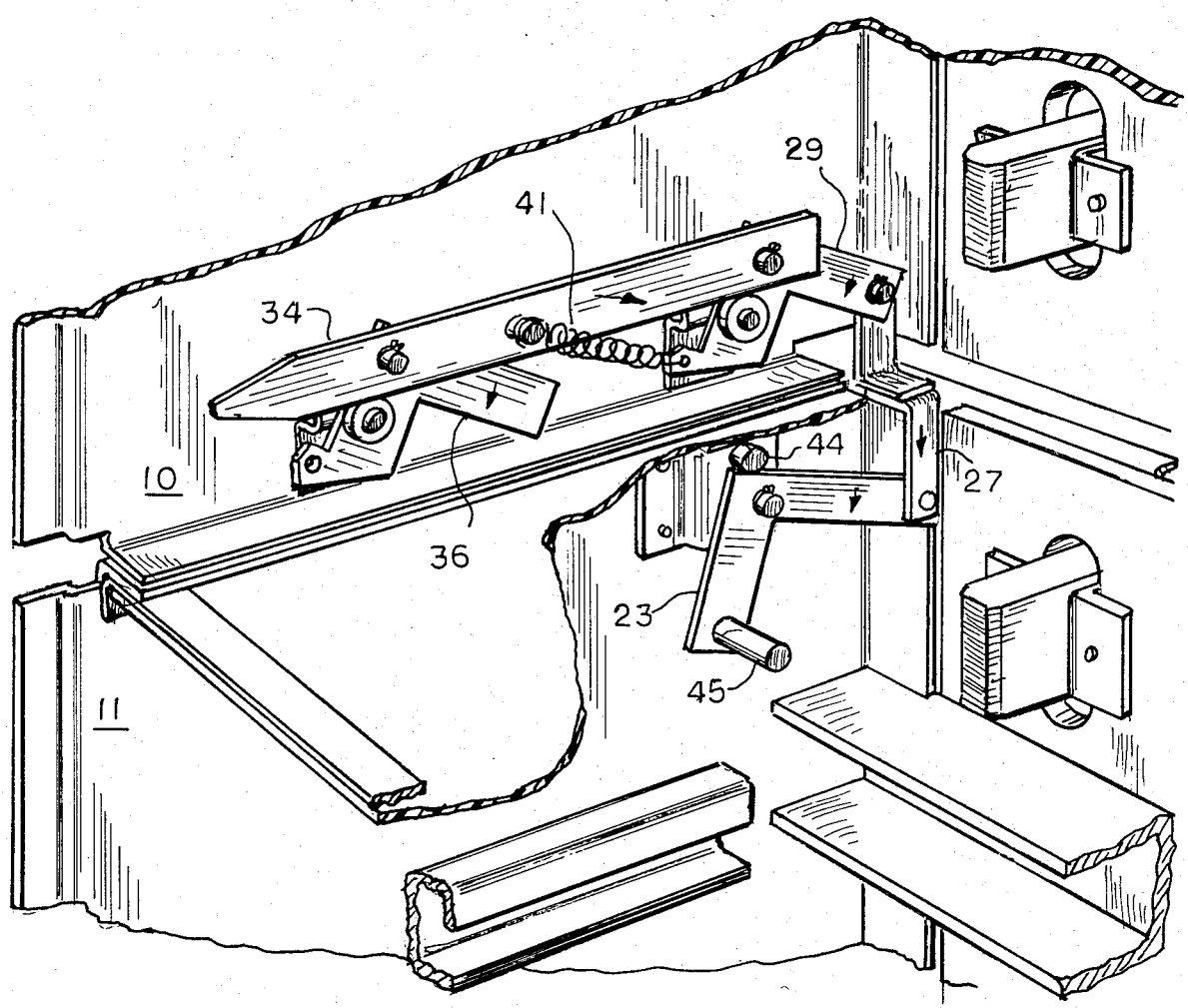
FIG. 4 is an enlarged side perspective view of the inventive interlock arrangement depicted in FIGS. 1-3.

FIG. 4 shows the arrangement of the interlock mechanism attached to compartments 10, 11 with the fuse carriage and the circuit breaker carriage removed. The position of the interlock is that depicted in FIG. 2 with the breaker carriage out of contact with pin 45 such that lever 23 is held against pin 44 and connecting link 27 is in the downward position as indicated. Levers 29 and 36 are pivoted in the clockwise direction as indicated and liftbar 34 is in its downward position, all under the influence of return spring 41.

Figure 5:
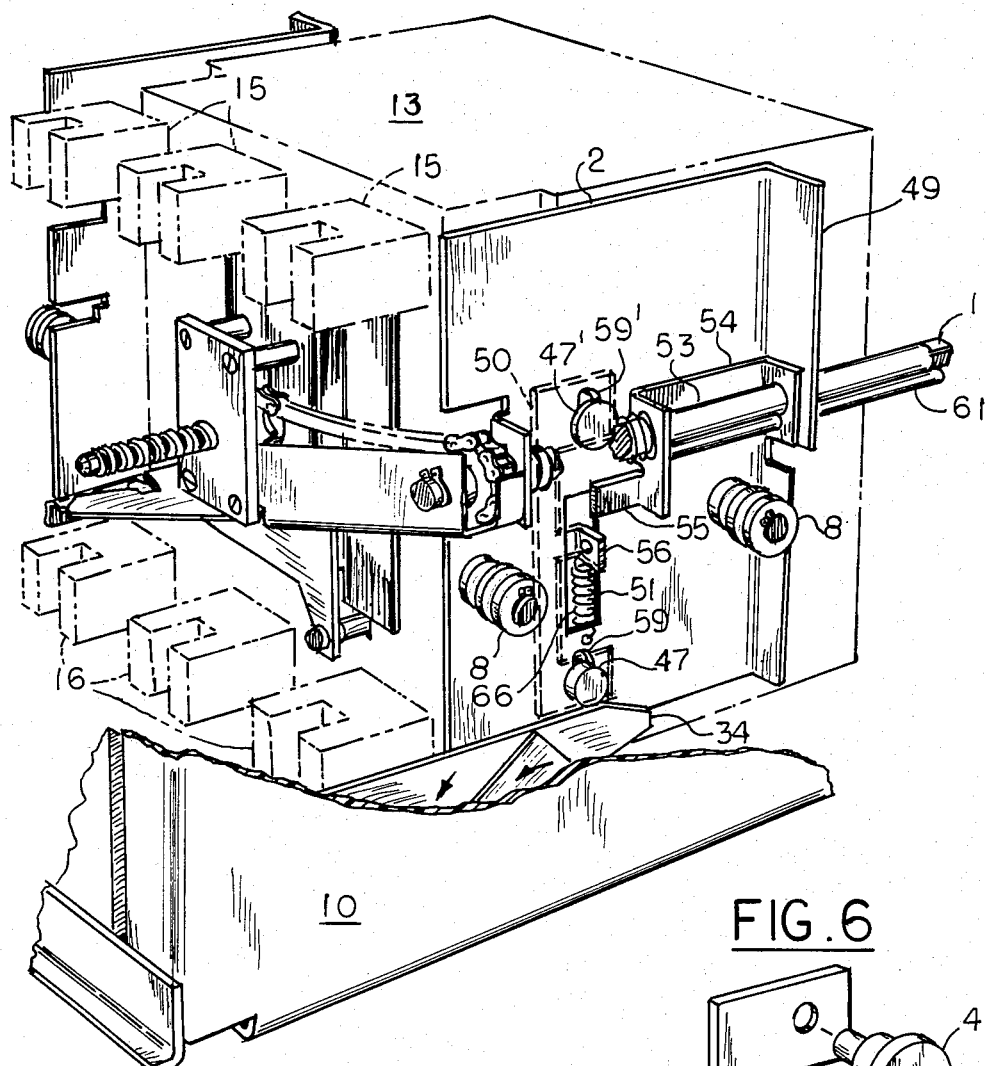
FIG. 5 is a side perspective view of the fuse carriage with the slide mounted on the carriage side wall.

The fuse carriage 13 is shown more clearly in FIG. 5 with the slide 54 and shaft 53 attached to the fuse carriage side wall 2 and extending through side wall extension 49. The wheels 8 for moving the carriage in and out of the fuse compartment are also mounted to the fuse carriage side wall. The interlock rod 61 can be readily displaced away from the formed end 1 of the shaft 53 when the liftbar 34, partially shown, is in its downward position as also depicted in FIG. 2. Slide 50 depicted in dashed lines is assembled behind the fuse assembly side wall 2 with pin 47 extending through slot 59, pin 47' through slot 59', and tab 56 extending through slot 51.

It can be seen that spring 66 by connection with tab 56 at one end, and the fuse assembly side wall 2 at the other end, holds slide 50 in a downward position out of the path of projection 55, when lift bar 34 is in a downward position. It is also within the scope of this invention to interchange the location of the breaker and fuse relative to each other so that the interconnection shown relative to contact pin 45 in breaker compartment 14 and pin 47 in fuse compartment 13 would be completely reversed to perform the same fuse-breaker interlock function.

We claim:

1. A circuit breaker-fuse interlock arrangement for an electric switchboard comprising:
   a first compartment in an electric switchboard containing an electric circuit breaker;
   a second compartment in said switchboard containing an electric fuse;
   means interconnecting with said first and second compartment for preventing said electric fuse from being electrically disconnected while said circuit breaker is electrically connected;
   first racking means for electrically connecting line and load plugs on said circuit breaker with first line and load stabs connecting with a power source and first blocking means in said first compartment for preventing access to said racking means; and
   second racking means for electrically connecting line and load plugs on said electric fuse with second line and load stabs connecting with said circuit breaker;
   said interconnecting means comprising a bell crank connected between said first and said second compartments wherein contact with said bell crank within said first compartment produces motion by said bell crank within said second compartment, a lift bar attached to said bell crank within said second compartment for becoming raised and lowered upon contact with said bell crank within said first compartment, a slide element intermediate said fuse and said lift bar for moving to a first position when said lift bar is raised and for moving to a second position when said lift bar is lowered, said slide element containing a pin projecting from a bottom of said slide and a tab projecting from said slide, said tab contacting said blocking means when said lift bar is in said first position.

2. The interlock arrangement of claim 1 including second blocking means in said second compartment for preventing access to said second racking means.

3. The interlock arrangement of claim 1 including a spring for raising said lift bar in a downward direction.

4. The interlock arrangement of claim 1 wherein said bell crank comprises a first lever pivotally attached within said first compartment and a second lever pivotally attached within said second compartment said first and second levers being interconnected by a connecting link.

5. The interlock arrangement of claim 4 wherein said connecting link is pivotally connected intermediate said first and second levers.

6. The interlock arrangement of claim 4 wherein said first lever includes a pin for contacting with said circuit interrupter and for translating forward motion of said interrupter to rotational motion of said first lever.

7. The interlock arrangement of claim 1 wherein said first blocking means is responsive to whether said circuit interrupter is in a tripped or untripped condition.

8. The interlock arrangement of claim 7 wherein said first blocking means prevents access to said first racking means when said circuit interrupter is in an untripped condition and allows access to said first racking means when said circuit interrupter is in a tripped condition.

9. The interlock arrangement of claim 1 wherein said slide element comprises an angled member and said tab comprises a projection of said angled member in the same plane as said pin.

* * * * *